(12) United States Patent
Chalmers et al.

(10) Patent No.: US 11,349,423 B2
(45) Date of Patent: May 31, 2022

(54) TIMER CIRCUIT FOR A DUAL LANE MOTOR CONTROLLER

(71) Applicant: TRW LIMITED, Solihull (GB)

(72) Inventors: Jon Barrie Chalmers, Warwick (GB); Paul Andrew Weaver, Wombourne (GB)

(73) Assignee: ZF AUTOMOTIVE UK LIMITED, Solihull (GB)

( * ) Notice: Subject to any disclaimer, the term of this patent is extended or adjusted under 35 U.S.C. 154(b) by 36 days.

(21) Appl. No.: 16/645,520

(22) PCT Filed: Sep. 18, 2018

(86) PCT No.: PCT/GB2018/052666
§ 371 (c)(1),
(2) Date: Mar. 9, 2020

(87) PCT Pub. No.: WO2019/053478
PCT Pub. Date: Mar. 21, 2019

(65) Prior Publication Data
US 2020/0280279 A1    Sep. 3, 2020

(30) Foreign Application Priority Data
Sep. 18, 2017    (GB) ...................................... 1715000

(51) Int. Cl.
*H02P 23/00*    (2016.01)
(52) U.S. Cl.
CPC ................................. *H02P 23/0004* (2013.01)

(58) Field of Classification Search
CPC .............................. H02P 23/0004; H02P 5/46
See application file for complete search history.

(56) References Cited

U.S. PATENT DOCUMENTS

| | | | |
|---|---|---|---|
| 2003/0200018 A1* | 10/2003 | Arimura | B62D 5/0457 701/41 |
| 2006/0261798 A1* | 11/2006 | Brassfield | H02J 1/102 323/351 |
| 2011/0204946 A1* | 8/2011 | Shori | G11C 7/1012 327/160 |

(Continued)

*Primary Examiner* — Rina I Duda
(74) *Attorney, Agent, or Firm* — Tarolli, Sundheim, Covell & Tummino LLP

(57) ABSTRACT

A timer circuit for use with a dual lane motor controller has two motor controllers, each motor controller generating PWM drive signals having a period defined by a respective timer of the timer circuit. The timer circuit comprises a first processing circuit associated with the first motor controller and comprising a first oscillator circuit, a first timer which outputs a first timer signal each time the oscillator circuit has completed a set integer number N of oscillations, and a second processing circuit associated with the second motor controller and comprising a second oscillator circuit. The second processing circuit includes a second timer which outputs a second timer signal each time the oscillator circuit has completed an integer number N* of oscillations, and calculates a value of N* that is dependent on the difference between the frequency of the first oscillator circuit and the second oscillator circuit required to match the period of the second timer signal to the period of the first timer signal.

16 Claims, 4 Drawing Sheets

(56) References Cited

U.S. PATENT DOCUMENTS

| | | | |
|---|---|---|---|
| 2011/0280299 A1* | 11/2011 | O'Malley | H03K 7/08 375/238 |
| 2013/0241452 A1* | 9/2013 | Suzuki | B62D 5/0403 318/400.15 |
| 2014/0195117 A1* | 7/2014 | Kuwahara | G01L 25/006 701/41 |
| 2016/0121420 A1* | 5/2016 | Denis | G01P 3/488 219/137.71 |

* cited by examiner

TIMER CIRCUIT FOR A DUAL LANE MOTOR CONTROLLER

RELATED APPLICATION

This application corresponds to PCT/GB2018/052666, filed Sep. 18, 2018, which corresponds to British Application No. 1715000.4, filed Sep. 18, 2017, the subject matter of which are incorporated herein by reference in their entirety.

This invention relates to improvements in timer circuits for use with a dual lane motor controller, and to dual lane motor controller including a timer circuit. It in particular but not exclusively relates to motor controllers for an electric power assisted steering system.

It is known to provide a motor control circuit for a multi-phase electric motor in which a required analogue waveform for the drive signal applied to each phase of the motor—typically a set of three or more sinusoidal waveforms that are out of phase with one another with one for each phase of the motor—is converted into a digital signal using pulse width modulation. The pulse width modulated (PWM) signals are then used to drive a set of switching devices, typically MOSFET transistors, which alternately connect each phase to either a positive or negative supply as defined by the state of the PWM signal.

In cases where a high degree of reliability is needed, it is known to provide a dual lane motor control circuit. In a dual lane motor control circuit, two motor controllers are provided with one designated as a master and the other as a slave. Each one is able to produce a set of PWM drive signals for the motor. The signals from the master motor controller are used during normal operation, and in the event of a fault in the master motor controller the slave motor controller is used to drive the motor.

In a further extension of the dual lane arrangement, the motor may also be dual wound meaning it has two fully independent sets of phase windings. Each of the two motor controllers may drive one set of the windings. Hence, if there is a fault in the master controller or master windings, the slave controller can still operate using the slave set of windings, albeit with the motor operating at half power.

The PWM signals can be generated by the motor controllers in a variety of manners. Whichever is selected, there is a requirement to set an appropriate period for the PWM waveforms. This is accomplished by providing a reference timer signal to the PWM waveform generator of each motor controller. The PWM waveform generator creates a set of PWM signals that fit within the PWM period.

In a fully robust arrangement with independent dual lane controllers, two reference timers may be provided, each one operating independent of the other and each providing a reference timer signal for the respective PWM waveform generator. The two timers should ideally be closely synchronised so that the two timers are in phase and that the periods set by each timer should also ideally be the same. This allows for the slave motor controller to smoothly take over from the master controller in the event of a fault occurring at any time. This is also a requirement where the motor is a dual wound motor, as any difference in the period of the two timer signals during normal operation will lead to incorrect motor function.

In a practical arrangement, each reference timer signal is generated from an oscillator circuit, such as a crystal oscillator that outputs through a phase locked loop to step up the frequency of the crystal oscillator. The output frequency of a typical oscillator circuit is too high to define the period of the PWM signal directly so the frequency is stepped down so that each cycle of the timer corresponds to multiple cycles of the oscillator. For instance a PWM period equal to 500 cycles of the oscillator circuit output may be used.

Where each lane is fed from a separate crystal oscillator, the applicant has noticed that the two reference timers can become slightly out of synchronisation due to a number of factors such as the influence of temperature on the oscillators. An object of the invention is to ameliorate issues that may arise if the timer frequencies are not carefully matched.

According to a first aspect the invention provides a timer circuit for use with a dual lane motor controller of the kind comprising a first motor controller and a second motor controller, each motor controller generating PWM drive signals having a period defined by a respective timer of the timer circuit, in which the timer circuit comprises:

a first processing circuit associated with the first motor controller and comprising a first oscillator circuit, a first timer which outputs a first timer signal each time the oscillator circuit has completed a set integer number N of oscillations, a second processing circuit associated with the second motor controller and comprising a second oscillator circuit, the second processing circuit further including a second timer which outputs a second timer signal each time the oscillator circuit has completed an integer number N* of oscillations, and in which the second processing circuit includes a calculating unit that calculate a value of N* that is dependent on the difference between the frequency of the first oscillator circuit and the second oscillator circuit required to match the period of the second timer signal to the period of the first timer signal.

The applicant has appreciated that two perfectly matched oscillator circuits will produce the same number of cycles in a given elapsed time, and that in such a case the timer circuit will set the values of N and N* to be equal. However, where the oscillators are imperfect the value of N* may be set to be slightly higher or slightly lower than the value of N depending on the relative frequencies of the two oscillator circuits.

The first processing circuit may further comprise a first counter that counts a number M of oscillations of the first oscillator circuit over a first elapsed time starting from a predefined start time and finishing when the counter has counted M of cycles of the oscillator, and a transmitter which outputs a trigger signal once the counter has reached the value M, the second processing circuit further comprising a receiver which receives the trigger signal and a second counter which determines a number M* of oscillations of the second oscillator circuit over an elapsed time corresponding to the first elapsed time, and the calculating unit of the second processing circuit may be configured to calculate a value of N* that is dependent on the difference between the value of M and the value of M* such that N* is the integer number of cycles of the second oscillator required to match the period of the second timer signal to the period of the first timer signal.

The predefined start time of the first counter may correspond to the time of the next oscillation of the first oscillator circuit following generation of the trigger signal. This may repeat indefinitely, so that a trigger signal is sent periodically. The start time of the second counters may also correspond to the time of the next oscillation of the second oscillator circuit following receipt of the trigger signal. This is a convenient way of ensuring the two counters are started at the same time and stopped at the same time.

In an alternative, the first processing circuit may generate a start signal which starts the count of the two counters and which may be transmitted to the second circuit. In a modification, the second processing circuit may generate the start signal and transmit it to the first processing circuit. A receiver would then be required as part of the first processing circuit. Once the start signal is received by the first circuit the first count may start on the next cycle of the oscillator circuit.

Of course, rather than starting the elapsed time on the very next cycle of the oscillator circuits a fixed delay may be introduced, for instance of 2 or 3 or more cycles or a fixed time, say 1 second or more.

The calculating unit may calculate the value of N* as follows:

$$N^* = N \times (M^*/M)$$

Where N* is the period of the second timer, in oscillator circuit cycles;
N is the period of the first timer expressed as an integer number of cycles of the first oscillator circuit;
M is the number of cycles of the first oscillator circuit in a fixed elapsed period of time; and
M* is the counted number of cycles of the second oscillator circuit in that same elapsed period of time.

Each of the oscillator circuits may comprise a crystal oscillator or resonator. The oscillator circuits may also include a phase locked loop which receives the output of the oscillator or resonator and produces a stepped up oscillating signal. The output of the oscillator circuit may comprise a set of pulses, each pulse being counted and representing one cycle. Alternatively, the output may be a square wave, and each cycle may correspond to the timing of each leading edge or of each trailing edge or each edge regardless of whether it is a trailing or leading edge.

The first and second processing circuits may comprise independent circuits or may comprise parts of a single common processing circuit. They circuit may, for example, comprise a computer program stored in an area of electronic memory that runs on a processing unit or microcontroller.

The value of M may be chosen to be greater than the value of N, and may be 3 times greater or 4 times greater or more. The longer the elapsed time chosen, the more noticeable any slight frequency variation between the two oscillators will be since the deviation in the values of M and M* will be greater.

The first processing circuit may function as a master timer circuit and may be assumed to have an oscillator which is used as a master to set the period of the two timer signals. In use, the configuration of the first and second processing circuits may be reversed so that the second processing circuit generates the trigger signal and sets the elapsed time and the first processing circuit determines from the trigger signal the period of the first timer signal.

To achieve this, the second processing circuit may further comprise a third counter that counts a number N of oscillations of the second oscillator over a first elapsed time starting from a predefined start time and finishing when the counter has counted a predefined number M of cycles of the oscillator, and a transmit which outputs a trigger signal once the counter has reached the value M.

The first processing circuit may further comprise a receiver which receives the trigger signal and a processor which determines the number M* of oscillations of the first oscillator over an elapsed time correspond to the first elapsed time, and the first processing circuit may include a calculating unit that in use calculates a value of N* that is dependent on the difference between the value of M and the value of M* such that N* is the integer number of cycles of the first oscillator required to match the period of the first timer signal to the period of the second timer signal.

The third counter may be the same counter as the second counter. The fourth counter may be the same as the first counter.

The trigger signal may encode the value of M, and may comprise solely the value of M.

According to a second aspect the invention provides a motor drive circuit that includes the timer of the first aspect, the circuit comprising two motor controllers as independent lanes, each motor controller generating a set of PWM signals having a period set by a respective one of the two timer signals of the timer circuit.

According to a third aspect the invention provides a method of operating two timers, each of which is driven by a respective oscillator circuit, the period of the first timer corresponding to the elapsed time between N cycles of the first oscillator circuit and the period of the second timer corresponding to the elapsed time between N* cycles of the second oscillator, the method comprising:
counting over an elapsed time the number of cycles M of the first oscillator circuit over a defined number of cycles;
counting the number of cycles M* of the second oscillator circuit that occurred during the same elapsed time; and
calculating the value of N* as a function of the difference between the value of M and M*.

There will now be described, by way of example only, one embodiment of the present invention with reference to and as illustrated in the accompanying drawings of which:

Figure 1:
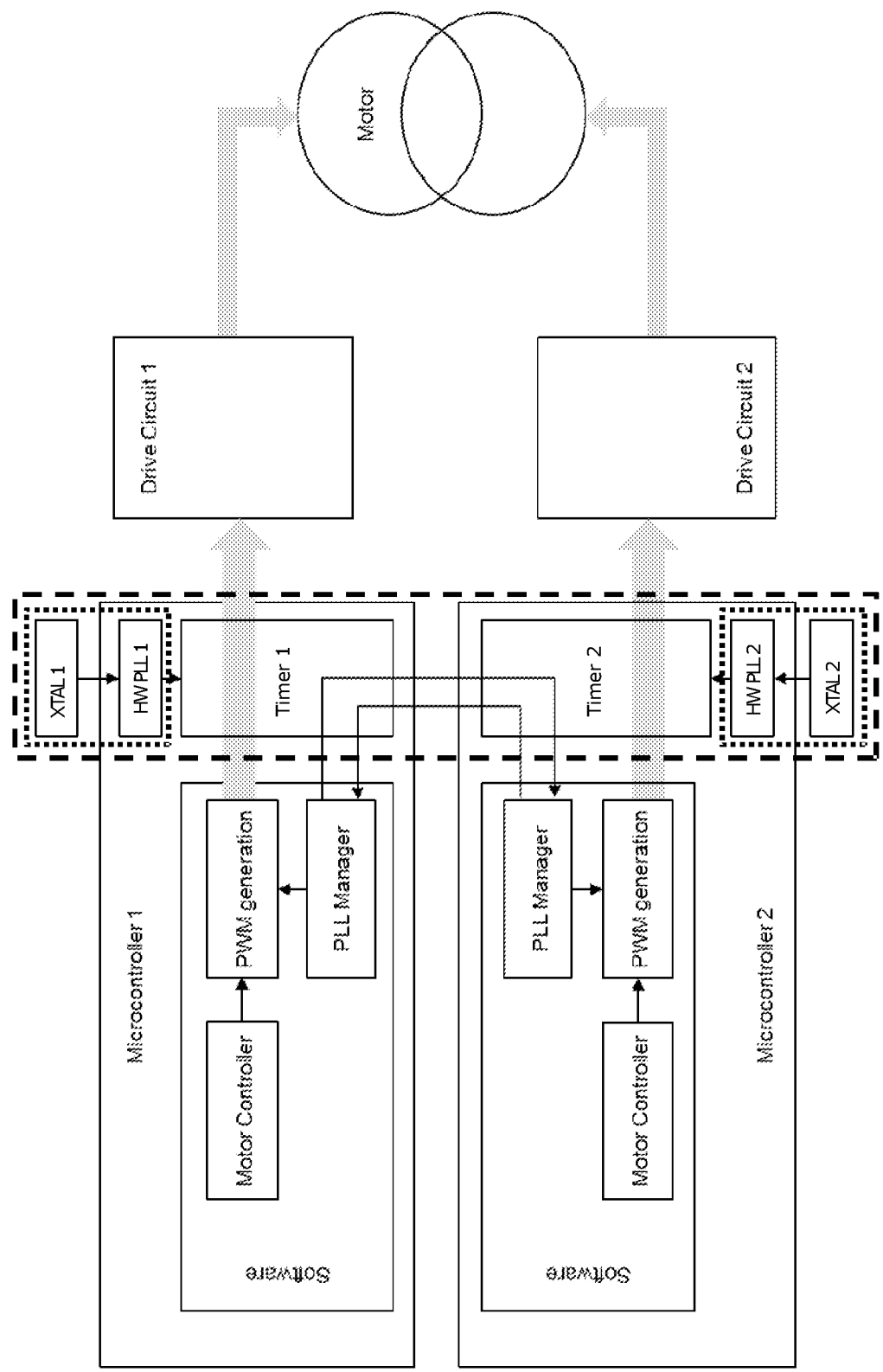
FIG. 1 is a schematic of a motor and control system that includes a timer circuit within the scope of the first aspect of the invention.

As shown in FIG. 1, a motor and control system comprises an electric motor that has two independent sets of phase windings. Each set of phase windings is driven by a respective lane of a two-lane motor controller.

The two-lane motor controller incorporates a timer circuit of the first aspect of the invention and comprises two independent microcontrollers which each include software that implements a motor controller function that calculates target motor phase voltages based on operating conditions of the motor, and a PWM generation function that converts the target motor phase voltages into PWM duty cycles. There is a hardware timer module in the microcontroller that outputs the PWM duty cycles as waveforms to the drive circuit.

In this example, each motor controller generates three PWM signals that are out of phase for driving a three phase motor. The two motor controllers in this example are configured as a master motor controller which in normal use supplies the drive signals to a motor bridge of a three phase electric motor whilst the other motor controller is configured as a slave motor controller and does not drive the motor bridge during normal use. In the event of a fault with the master motor controller, the slave motor drive circuit may take over the drive of the motor bridge with the master motor controller disabled.

The PWM signals for each lane are synchronised to a timer signal from a timer. The timer signal is fed to a hardware implemented phase locked loop (PLL) Manager function that is implemented within the respective microcontrollers. In this example the timer signal output from the hardware timer of each microcontroller is derived from a crystal or resonator. The crystal or resonator operates at a relatively low frequency of, for example, 20 MHz and a hardware phase locked loop PLL component of the microcontroller functions as a frequency multiplier to increase this to a higher frequency for example 200 MHz.

In the example shown, each motor controller generates PWM signals synchronised to the respective timer signal output from the hardware timer, so that two timers are provided. The timers are independent and are generated from a respective oscillator crystal and hardware PLL as described above.

Figure 2:
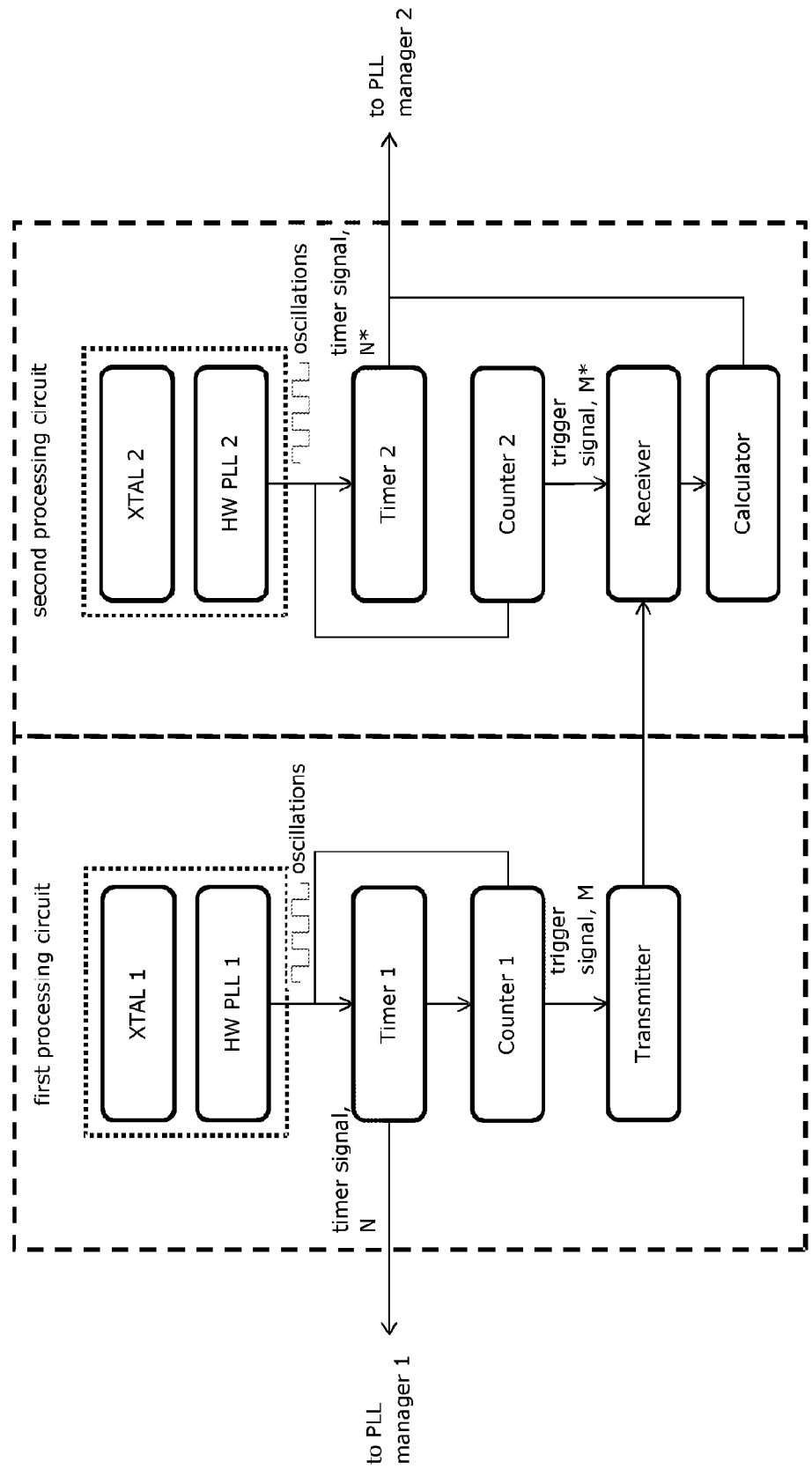
FIG. 2 is a block diagram showing the key parts of the timer circuit.

The two timers that supply the timer signals to the two motor controllers form a part of and are controlled by a timer circuit implemented across the two microcontrollers. This timer circuit is arranged as a dual lane circuit, with one lane associated with each lane of the motor control circuit. The timer circuit is arranged in accordance with an embodiment of the present invention and the functional components of the timer circuit are shown schematically in FIG. 2.

The timer circuit comprises two processing circuits. A first one of the processing circuits in this example forms a part of the first motor controller and the second forms a part of the second motor controller.

The first processing circuit comprises a first oscillator circuit made up from a XTAL and a hardware PLL, a first timer, a first counter and a transmitter for transmitting a trigger signal to the second processing circuit. The second processing circuit comprises a second oscillator circuit made up of a second XTAL and a second hardware PLL, a second timer, a second counter, a receiver that receives the signals transmitted from the first circuit and a calculating unit.

Figure 3:
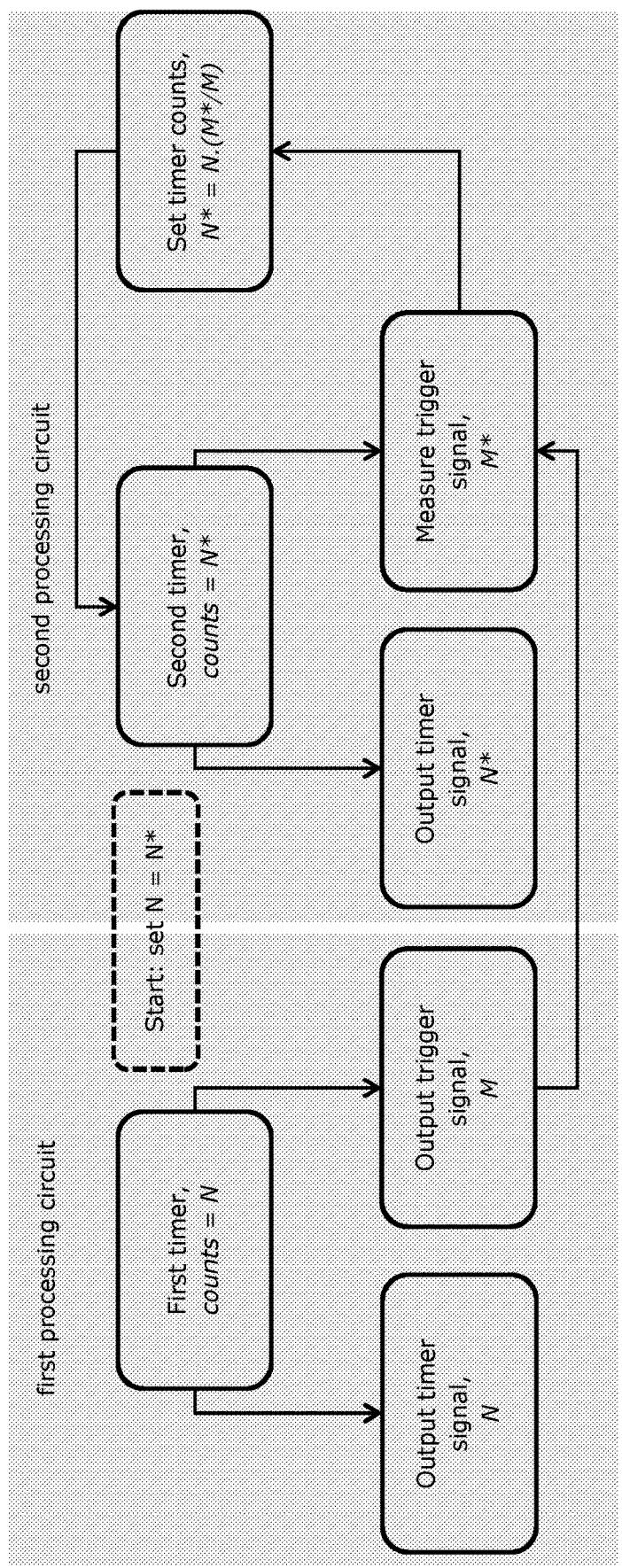
FIG. 3 is a flow diagram showing the operation of the timer circuit when the first timer circuit is functioning as a master circuit.

The operation of the various functional parts of the timer circuit is shown in FIG. 3 for the case where the first timer acts as a master timer and the second timer as a slave timer.

The first processing circuit outputs a first timer signal each time the oscillator circuit has completed a set integer number N of oscillations. In this example, the number is set at 500 cycles. This defines the timer signal which is supplied to the software PLL. The timer signal in this example has the form of a square wave with a period equal to M. The timer signal could, however, have the form of a series of pulses that are spaced with a period M. Other options will be known to the skilled person.

The first counter counts the oscillations of the first oscillator circuit (the output of the first hardware PLL) over a first elapsed time starting from a predefined start time and finishing when the counter has counted a predefined number M cycles. In this example, the value of M is set at 2000, exactly 4 times higher than the value of N. The counter resets once the value M has been reached and starts to count again. This may repeat continuously during the on time of the timer circuit, or may only occur during a test cycle time which can be automatically or manually set by a user. The test cycle may occur each time the motor control circuits are switched on for example. This count defines a trigger signal which has a longer period than the timer signal.

The transmitter functions to transmit the trigger signal, encoding the value M, to the second processing circuit once the trigger signal has been generated.

The second processing circuit associated with a second motor controller includes a receiver that receives the trigger signal, a second oscillator, a second counter, and a calculating unit.

The receiver receives the trigger signal and a processor of the second processing unit then determines the number M* of oscillations of the second oscillator that occurred over the same elapsed time correspond to the first elapsed time. To do this, the second counter of the second processing unit starts to count at the same time as the first counter and stops counting once the trigger signal is received. The value of this second count, M* is then fed along with the value M encoded in the trigger signal to the calculating unit. The calculating unit calculates a value of N* that is dependent on the ratio of M to M* such that N* is the integer number of cycles of the second oscillator required to match the period of the second timer signal to the period of the first timer signal.

The value N* is then used by the second processing circuit to set the frequency of the second timer signal, thereby ensuring that the frequency of the first timer and second timers are matched.

In mathematical terms, the calculating unit in this example performs the following calculation:

$$N^* = N \cdot (M^*/M)$$

The trigger signal can therefore be considered to perform two functions:
1) Allow synchronisation of the two software control algorithms at a coarse level (typical granularity is ~10 ns) set by the value of the count M; and
2) Observe the period of the trigger signal in terms of oscillator circuit counts and adjust the period of the second timer signal in terms of the PWM edge positions and timer reload values to achieve the same overall timing between lanes (typical granularity ~10 ns).

Figure 4:
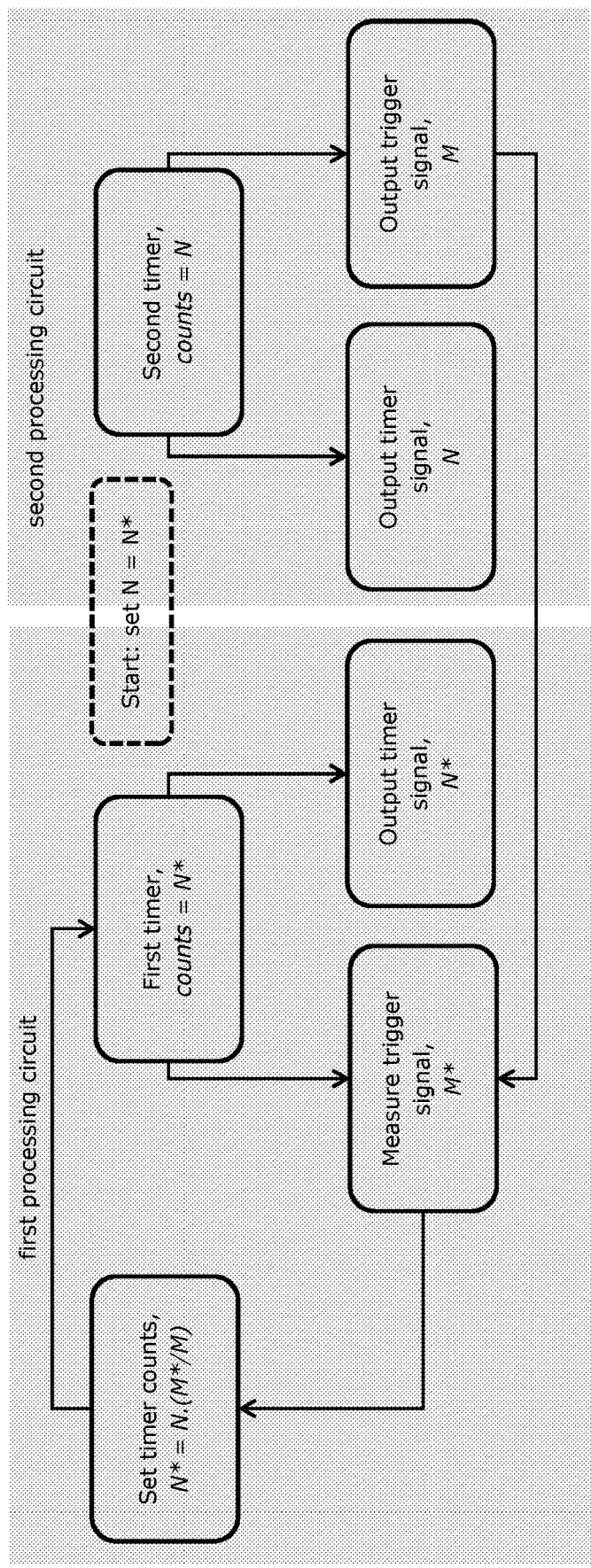
FIG. 4 is a flow diagram equivalent to FIG. 3 for when the second timer circuit is functioning as the master circuit.

In a modification shown in FIG. 4 the second circuit may function as the master and the first signal processing unit may function as the slave. This requires the second processing unit to set the value M of cycles for the second timer signal and to produce the trigger signal. The first processing unit must receive the trigger signal and in turn calculate a value N* to apply to the first timer.

The invention claimed is:

1. A timer circuit for use with a dual lane motor controller comprising a first motor controller and a second motor controller, each motor controller generating PWM drive signals having a period defined by a respective timer of the timer circuit, in which the timer circuit comprises:
  a first processing circuit associated with the first motor controller and comprising a first oscillator circuit, a first timer which outputs a first timer signal each time the first oscillator circuit has completed a set integer number N of oscillations,
  a second processing circuit associated with the second motor controller and comprising a second oscillator circuit,
    the second processing circuit further including a second timer which outputs a second timer signal each time the second oscillator circuit has completed an integer number N* of oscillations, and in which the second processing circuit includes a calculating unit that calculate a value of N* that is dependent on the difference between a frequency of the first oscillator circuit and the second oscillator circuit required to match a period of the second timer signal to a period of the first timer signal.

2. A timer circuit according to claim 1, wherein the first processing circuit further comprising a first counter that counts a number M of oscillations of the first oscillator circuit over a first elapsed time starting from a predefined start time and finishing when the counter has counted M of cycles of the oscillator, and a transmitter which outputs a trigger signal once the counter has reached the value M, the second processing circuit further comprising a receiver which receives the trigger signal and a second counter which determines a number M* of oscillations of the second oscillator circuit over an elapsed time corresponding to the first elapsed time, and in which the calculating unit of the second processing circuit is configured to calculate a value of N* that is dependent on the difference between the value of M and the value of M* such that N* is the integer number of cycles of the second oscillator required to match the period of the second timer signal to the period of the first timer signal.

3. A timer circuit according to claim 1, in which the predefined start time of the first counter corresponds to the time of the next oscillation of the first oscillator circuit following generation of the trigger signal.

4. A timer circuit according to claim 3, in which the start time of the second counter correspond to the time of the next oscillation of the second oscillator circuit following receipt of the trigger signal.

5. A timer circuit according to claim 1, in which the first processing circuit is configured to generate a start signal which starts the count of the two counters and transmit the start signal to the second processing circuit.

6. A timer circuit according to claim 1, in which the second processing circuit is configured to generate the start signal and transmit the start signal to the first processing circuit.

7. A timer circuit according to claim 1, in which the calculating unit calculates the value of N* using the equation: $N^* = N \cdot (M^*/M)$.

8. A timer circuit according to claim 1, in which each of the oscillator circuits comprises a crystal oscillator and a phase locked loop.

9. A timer circuit according to claim 8, in which the crystal oscillators have a frequency in a range of 10 Mhz to 20 Mhz and in which the phase locked loop steps up the frequency of oscillation to a range of 100 Mhz to 200 Mhz.

10. A timer circuit according to claim 1, in which the first and second processing circuits comprise independent circuits.

11. A timer circuit according to claim 1, in which the value of M is chosen to be greater than the value of N.

12. A timer circuit according to claim 1, in which, in use, the configuration of the first and second processing circuits may be reversed so that the second processing circuit generates the trigger signal and sets the elapsed time and the first processing circuit determines from the trigger signal the period of the first timer signal.

13. A timer circuit according to claim 12, in which the second processing circuit further comprises a third counter that counts a number M of oscillations of the second oscillator circuit over a first elapsed time starting from a predefined start time and finishing when the counter has counted a predefined number M of cycles of the oscillator circuit, and a transmitter which outputs a trigger signal once the counter has reached the value M.

14. A timer circuit according to claim 12, in which the first processing circuit further comprises a receiver which receives the trigger signal and a processor which determines the number M* of oscillations of the first oscillator over an elapsed time correspond to the first elapsed time, and the first processing circuit includes a calculating unit that in use calculates a value of N* that is dependent on the ratio between the value of M and the value of M* such that N* is the integer number of cycles of the first oscillator required to match the period of the first timer signal to the period of the second timer signal.

15. A motor drive circuit comprising the timer circuit of claim 1, the motor drive circuit comprising two motor controllers as independent lanes, each motor controller generating a set of PWM signals having a period set by a respective one of the two timer signals of the timer circuit.

16. A method of operating two timers, each of which is driven by a respective oscillator circuit, the period of the first timer corresponding to the elapsed time between N cycles of the first oscillator circuit and the period of the second timer corresponding to the elapsed time between N* cycles of the second oscillator circuit, the method comprising:

counting over an elapsed time the number of cycles M of the first oscillator circuit over a defined number of cycles;

counting the number of cycles M* of the second oscillator circuit that occurred during the same elapsed time; and calculating the value of N* as a function of the ratio between the value of M and M*.

* * * * *